Aug. 4, 1936.  L. D. KAY  2,050,056
FOUR-WHEEL SPRING SUSPENSION MECHANISM FOR TRUCKS
Filed Nov. 5, 1934  3 Sheets-Sheet 1
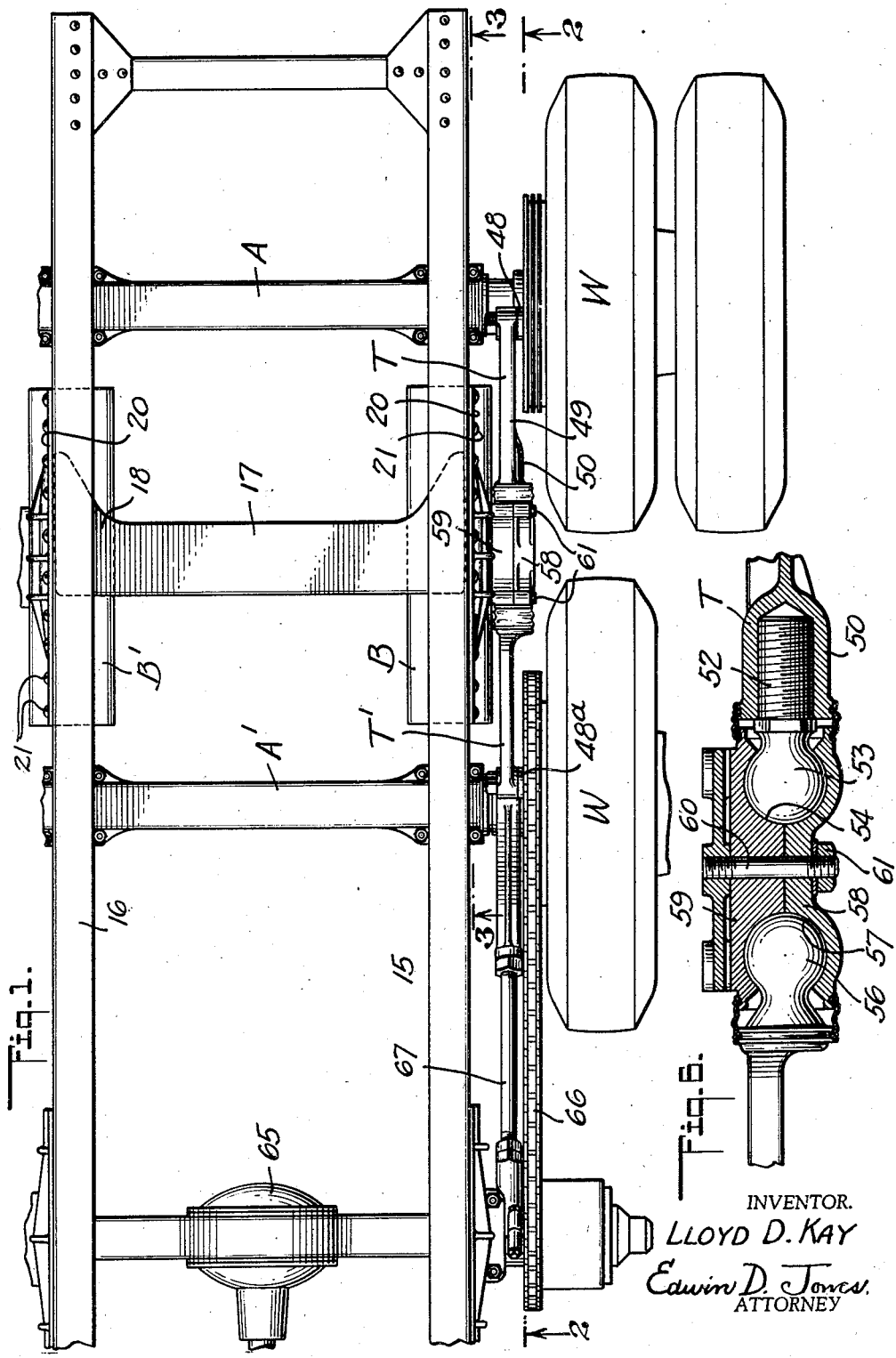
INVENTOR.
LLOYD D. KAY
Edwin D. Jones
ATTORNEY Aug. 4, 1936.  L. D. KAY  2,050,056
FOUR-WHEEL SPRING SUSPENSION MECHANISM FOR TRUCKS
Filed Nov. 5, 1934  3 Sheets-Sheet 2
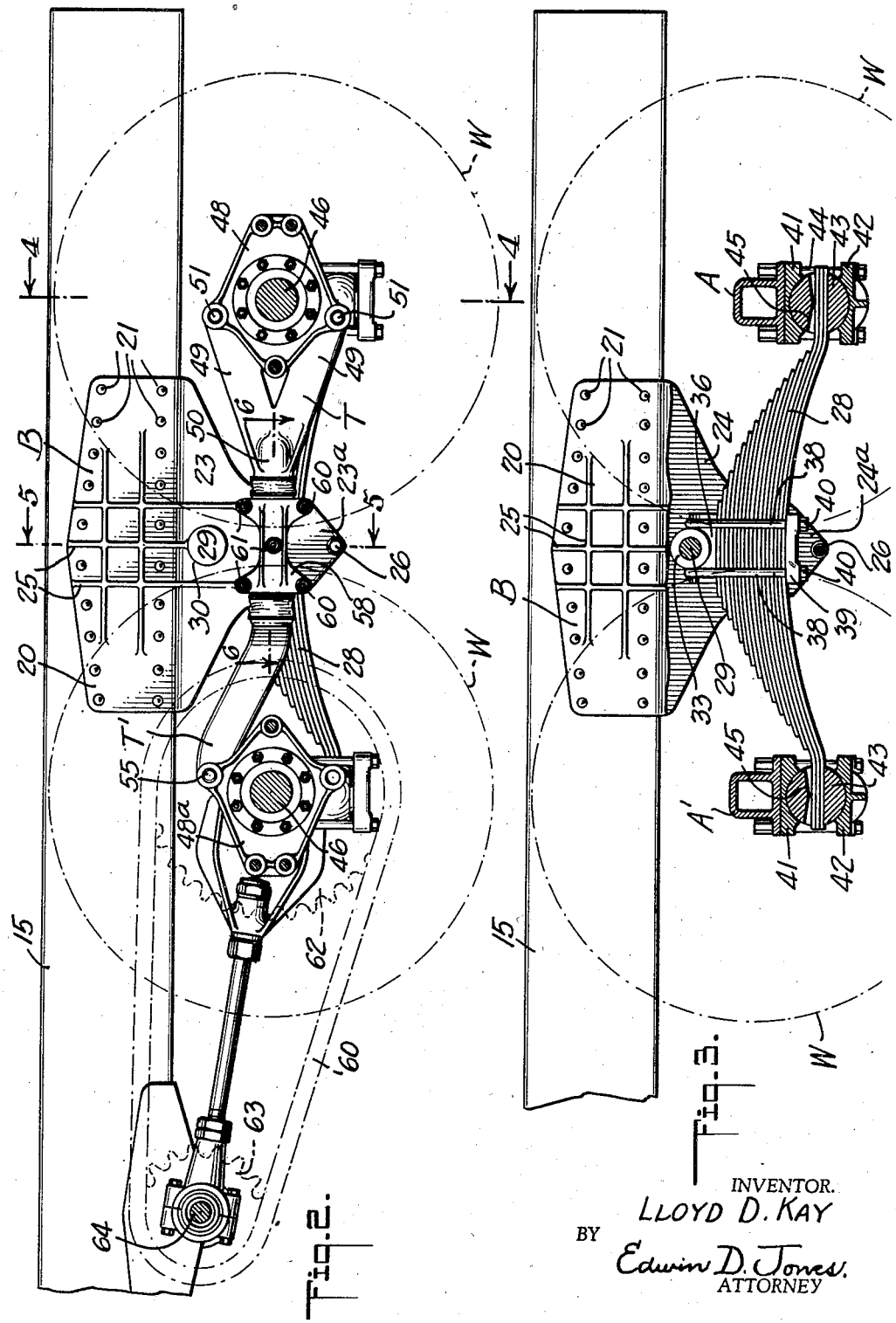
INVENTOR.
LLOYD D. KAY
BY Edwin D. Jones
ATTORNEY Aug. 4, 1936.  L. D. KAY  2,050,056
FOUR-WHEEL SPRING SUSPENSION MECHANISM FOR TRUCKS
Filed Nov. 5, 1934  3 Sheets-Sheet 3
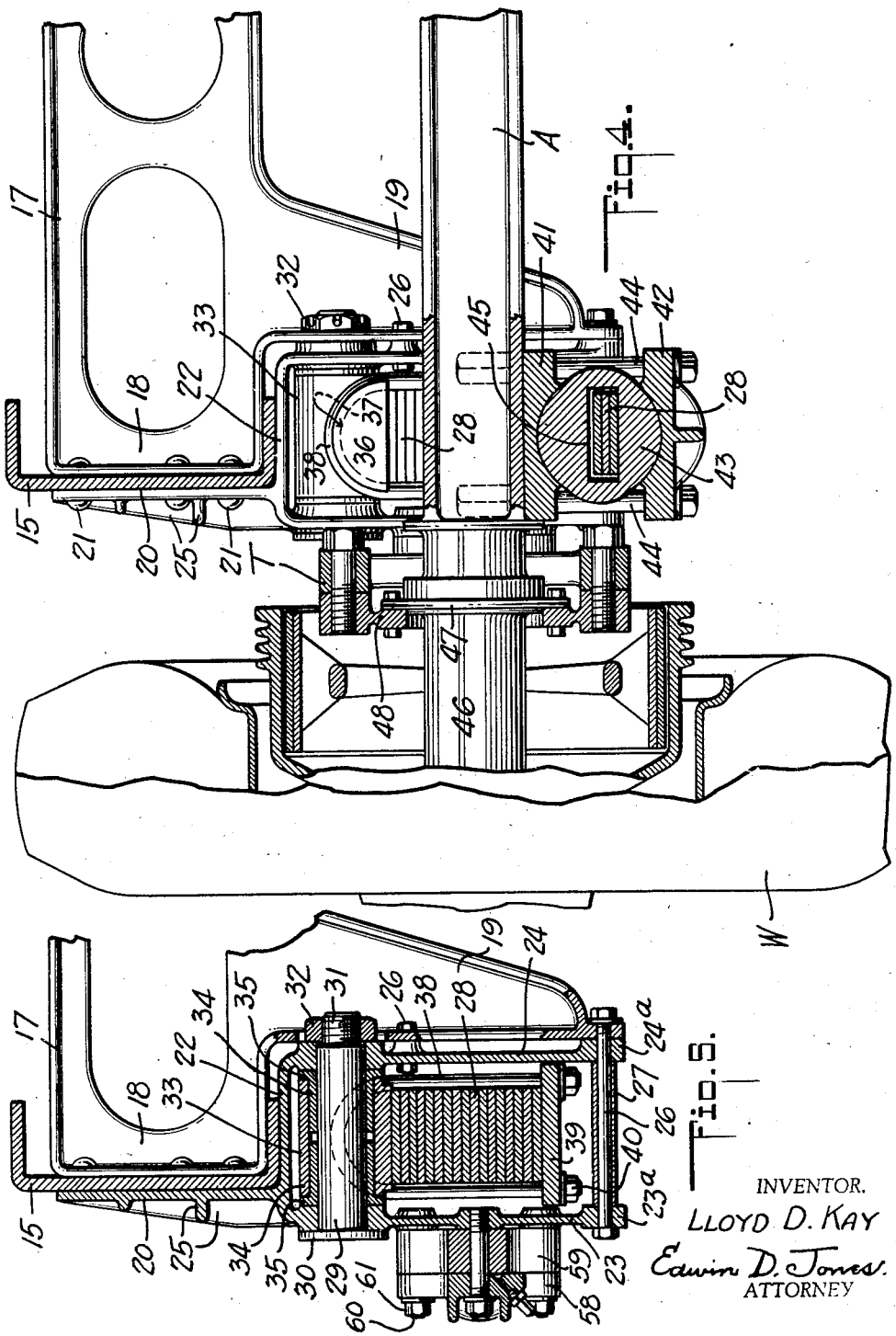
INVENTOR.
LLOYD D. KAY
Edwin D. Jones
ATTORNEY Patented Aug. 4, 1936

2,050,056

UNITED STATES PATENT OFFICE 2,050,056

FOUR-WHEEL SPRING SUSPENSION MECHANISM FOR TRUCKS

Lloyd D. Kay, Alhambra, Calif., assignor to Kay-Brunner Steel Products Inc., a corporation Application November 5, 1934, Serial No. 751,495

5 Claims. (Cl. 280—106.5)

My invention relates to motor trucks or buses of that type having rear wheels in pairs at opposite sides of the chassis frame.

Heretofore, such truck wheels have been so associated with the truck frame as to offer little resistance to the wheels at one side of the frame from tracking a different path, or the wheels of the forward pair tracking a path not paralleling that of the rear pair, and, in consequence, uneven and excessive tire wear has resulted, in addition to setting up added resistance to free rolling movement of the wheels and, hence, increasing the power required to propel the truck.

Further, previous spring suspension mechanisms for the four rear wheels of a truck have been so constructed as to necessitate the employment of very heavy springs, greatly decreasing their resiliency and correspondingly increasing the transmission of shocks to the truck frame; and the correlation of these spring suspension mechanisms with the wheels has been such as to increase rather than decrease the possibility of spring breakage by reason of the fact that the springs are subjected to torsional strains and stresses and excessive flexing.

It is a purpose of my invention to provide a spring suspension mechanism for the four rear wheels of a truck, which is functionally characterized by its ability to fixedly maintain a definite spaced relationship between the leading and trailing wheels thereof under practically any and all conditions, to the end of causing the rear wheels at one side of the truck to permanently track one and the same path and a path which is at all times parallel to the path tracked by the rear wheels at the other side of the truck.

It is also a purpose of my invention to provide a four wheel spring suspension mechanism for trucks which is structually characterized by a pair of axles one for each pair of wheels, with the axles suspended from the truck frame for movement relative to such frame, yet connected one to the other so as to be capable of independent movement vertically, but yet maintaining a spaced parallel relationship in order to at all times maintain the wheels carried thereby in alinement.

A further purpose of my invention resides in the provision of a spring suspension mechanism wherein a spring is provided for each pair of wheels which is mounted for rocking movements about a fixed axis to allow either end thereof to move vertically in response to vertical movements of the corresponding wheel and yet permit the spring to flex and absorb shocks imposed on either wheel.

A still further purpose of my invention is a provision of a connection between the aforementioned axles and springs which eliminates the use of the conventional spring shackles and which permits the usual weaving motion of the spring leaves; allows full flexing of the springs; and at the same time prevents torsional stresses being imparted to the spring by reason of any turning movements of the axles about their own axes.

I will describe only one form of four wheel spring suspension mechanism for trucks embodying my invention, and will then point out the novel features thereof in claims.

In the accompanying drawings:

Fig. 1 is a view showing in top plan the rear part of a motor truck frame having applied thereto one form of spring suspension mechanism embodying my invention for the four rear wheels thereof; only the rear wheels at one side of the frame and the accompanying part of the spring suspension mechanism being shown to simplify the drawings.

Figs. 2 and 3 are longitudinal sectional views taken on the lines 2—2 and 3—3, respectively, of Fig. 1, and looking in the direction of the arrows.

Figs. 4 and 5 are enlarged transverse sectional views taken on the lines 4—4 and 5—5, respectively, of Fig. 2, and looking in the direction of the arrows.

Fig. 6 is an enlarged horizontal sectional view taken on the line 6—6 of Fig. 2.

Referring specifically to the drawings and particularly to Fig. 1, I have here shown the rear part of a conventional form of motor truck frame, and this frame includes side rails 15 and 16 secured in spaced parallelism and each of channel form. My invention includes a cross member 17 arranged transversely of the rails 15 and 16 so as to span the latter. This cross member 17 is of channel form to lend strength thereto, and its ends 18 are closed and of such size as to freely fit within the grooves in the confronting sides of the rails 15 and 16, as best shown in Fig. 4. Adjacent its ends the cross member is formed with depending portions 19 which project beneath the frame rails for connection to a pair of brackets B and B¹.

The brackets B and B¹ are arranged at the outer sides of the rails 15 and 16, respectively, and opposite the ends of the cross member 17. These brackets each comprise an upper portion 20 elongated horizontally and secured to the rails 15 and 16 and to the ends 18 of the cross member 17 by means of rivets 21, as clearly illustrated in Figs. 2 and 4. Each bracket also includes a horizontal portion 22, from the opposite edges of which depend a pair of plates 23 and 24. By reference to Fig. 4, it will be seen that the upper portion 20 is adjacent the outer plate 23 in order to permit centering of the plates 23 and 24 transversely with respect to the respective rail 15 or 16, and to dispose the inner plate 24 adjacent the corresponding depending portion 19 of the cross member 17.

For the purpose of strengthening the bracket

B or B¹, the upper portion 20 and the outer plate 23 are formed with ribs 25 preferably arranged in the intersecting relation shown in Fig. 2. Here it will be noted that the plate 23, as well as the plate 24, is shaped to provide its greatest width at its center and to thereby form a depending part 23ᵃ or 24ᵃ which is adapted to be secured to the depending portion 19 of the cross member 17 by means of bolts 26. One of these bolts is provided with a spacing sleeve 27 in order to maintain the plates 23 and 24 in spaced parallel relationship, as clearly illustrated in Fig. 5.

The construction of the cross member and each bracket, and the association of one to the other and with the side rails of the frame, is such as to produce an extremely rigid assembly that serves to effectively brace the side rails against relative movement and to successfully resist lateral and torsional stresses to which both the rails and brackets are subjected when in actual use. It is an important feature of my invention that the construction of the cross member and the brackets is such as to permit securing of these elements to the side rails of the frame at any desired point along the length of the frame, in order that the load for which the truck is designed to carry may be supported to the greatest advantage.

Each bracket B or B¹ is provided for the purpose of supporting a leaf spring 28 for rocking movement upon the truck frame, and to this end the bracket has extending through the plates 23 and 24 thereof, a trunnion 29. As best shown in Fig. 5, this trunnion is formed at its outer end with a head 30, and at its inner end with a reduced threaded portion 31 on which a nut 32 is screwed to cooperate with the head in securing the trunnion within the plates. A bearing sleeve 33 surrounds the trunnion 29 between the plates 23 and 24, and interposed between the sleeve and the trunnion is a two-part bushing 34. The outer ends of this bushing are flanged as indicated at 35, and these flanges are interposed between the ends of the sleeve and the inner walls of the plates 23 and 24 to function as axial thrust bearings.

The bearing sleeve 33 is formed integral with and medially of an upper member 36, and this member is shaped to loosely fit between the bracket plates 23 and 24 and to provide grooves 37 in which the bights of U-bolts 38 are seated. The parallel parts of the bolts extend downward at opposite sides of the spring 28, and their lower ends project through a lower plate member 39 at the under side of the spring with nuts 40 applied to secure the bolts and plate member in firm embracing relation to the spring. Thus the two members 36 and 39 coact with the bolts 38 to form a hanger in which the spring 28 is suspended from the bracket B or B¹ for rocking movement about the trunnion 29 as a center.

A pair of axles A and A¹ are situated beneath and transversely of the truck frame so as to be connected to and wholly supported by the springs 28. To this end the axles are connected to the ends of the two springs by connectors which possess the function of permitting universal movement of the axles in relation to the springs. In the present instance, each connector comprises a socket made up of an upper plate 41 and a lower plate 42, the confronting sides of these plates being cupped as shown to coact in forming a socket for the reception of a ball 43. The two plates are secured to the respective axle A or A¹ and to each other to embrace the ball 43, by means of bolts 44 (Fig. 3).

The ball 43 is formed with a slot 45 of a width to freely receive and permit limited edgewise movement of the several master leaves of the spring. In this manner the master leaves are permitted to weave as will be understood by those skilled in the art. The height of the slot is such as to freely receive the master leaves of the spring so that they can move longitudinally in the slot, while the upper wall of the slot is of anticlinal form in order to increase the height of the slot at the ends thereof. By making one end of the slot of greater height, one or more of the spring leaves above the master leaves are permitted at their ends to enter the slot in the event of excessive flexing of the spring.

The purpose of making the slot of greater height at both ends is to permit either end of the slot to be presented to the spring, thus facilitating assembly of the spring and the connector. Thus with each axle connected to the respective ends of the two springs by the connectors just described, the axles are suspended from the springs for movement universally with respect thereto and yet the springs are free to flex in the normal manner, as will be more fully described hereinafter. The axles A and A¹ are of the same construction as the axle embodied in my copending application filed September 19, 1934, and bearing Serial No. 744,698.

Each axle A or A¹ terminates at its ends in spindles 46 on each of which one or two wheels W are journaled. At the inner end of each spindle an annular flange 47 is formed on the axle, and to this flange is bolted a brake anchor member 48 or 48ᵃ. As will be clear from an inspection of Fig. 2, the anchor members of one axle are reversely arranged with respect to those of the other axle in order that respective brake shoes and actuating mechanisms can be associated therewith as required.

For the purpose of maintaining the axle A and A¹ in parallel spaced relation one to the other in order that the wheels on one end of the axles will be maintained in alinement with the wheels at the other end of the axles, and irrespective of what positions the axles assume vertically, torque rods T and T¹ are provided. The torque rods T for the rear axle A are connected at their rear ends to the anchor members 48, and at their forward ends to the plates 23 of the brackets B and B¹. The torque rods T¹ for the front axle A¹ are connected at their rear ends to the brackets B and B¹, and at their forward ends to the anchor members 48ᵃ.

Each torque rod T comprises arms 49 diverging from a sleeve 50 fixedly connected to the respective anchor member at the points indicated at 51 in Fig. 2. The sleeve 50 is interially threaded to receive a shank 52 on a ball 53 which is rotatably fitted in a socket 54 (Fig. 6) so that the rod is universally movable with respect to the bracket. Each torque rod T¹ comprises a single arm curved upwardly from its rear end to its forward end where it is fixed to the anchor member 48ᵃ at the point indicated at 55. The rear end of the rod T¹ is provided with a ball 56 formed integral therewith and rotatably fitted in a socket 57 so that the rod is universally movable with respect to the bracket.

The two sockets 54 and 57 are formed by cupping the confronting sides of a pair of plates 58 and 59. By means of studs 60 and 61 (Figs. 2, 5, and 6) the inner plate 59 is secured to the plate 23 of the bracket B or B¹, and the outer plate 58 to the inner plate 59. In this manner the cupped portions of the plates are held in socket forming relation, and thus the balls 53 and 56 are confined therein against displacement.

The reason for constructing each torque rod T¹ of a single arm instead of a double arm as in the case of rods T, is to provide the necessary clearance for a chain and sprocket mechanism. In this embodiment of my invention I have included driving mechanisms for each of the wheels on the axle A¹ in order to show that my spring suspension mechanism is not limited in its adaptation merely to the four idle wheels of a truck or trailer, and that it requires only a slight structural modification of the rods T¹ in order to adapt it to the driven wheels.

By reference to Figs. 1 and 2, it will be seen that the driving mechanism for one of the wheels of the axle A¹ (and it will be understood that it is the same for the other wheel on the axle A¹) is the same as disclosed in my copending application hereinbefore referred to, and hence, it comprises a sprocket 62 secured to the respective wheel W, and a smaller sprocket 63 secured to a jack shaft 64 in a housing 65. About these sprockets is trained an endless chain 66, and thus motion from the jack shaft is transmitted to the wheel. A radius rod 67 connects the axle A¹ with the housing 65 to restrict movement of the axle to an arc which is concentric to the jack shaft, and to thereby prevent tightening or loosening of the chain 66, irrespective of the position occupied by the axle.

From the preceding description taken in conjunction with the accompanying drawings, it will be manifest that I have provided a spring suspension mechanism for the four rear wheels of a motor truck or other form of wheeled vehicle, in which the two springs are suspended from the truck frame to rock independently about a fixed point so as to allow either wheel of a pair to move vertically without transmitting such movement to the truck frame, thereby eliminating the resultant shock and twisting of the truck frame. In responding to such vertical wheel movements, the springs are still free to flex and absorb shocks to a superior degree in respect to the conventional spring suspension mechanisms, because of the ball and socket connections of such springs with the axles. These connections allow the springs to flex to a maximum degree by reason of the fact that the springs are not tied to the axles as in the case of spring shackles, but are free to move transversely on the axles.

Further, in supporting relatively heavy loads, the springs will automatically shorten themselves to increase the effective strength and thus adequately and resiliently support such loads without the possibility of spring breakage. The ball and socket connections also allow sufficient movement between the axles and springs to prevent the spring leaves from being subjected to twisting or torsional stresses, and as a consequence, the spring leaves are at all times free to flex individually and collectively to attain maximum resiliency and eliminate the possibility of leaf breakage as a result of such twisting stresses. The flexibility afforded by the connections between the springs and axles can be regulated as required by an adjustment of the plates 41 and 42 to increase or decrease the friction between the balls 43 and the plates, and in this manner to control rotative movement of the balls.

It is also characteristic of my invention that the torque rods, while allowing independent movement of the axles relatively to attain the required independent movement of the wheels and thus utilize to a maximum the resiliency of the springs, also hold the axles in spaced parallelism in order to maintain alinement of the wheels and thus attain the advantages of reduced and uniform tire wear.

Although I have herein shown and described only one form of four wheel spring suspension mechanism for trucks embodying my invention, it is to be understood that various changes and modifications may be made herein without departing from the spirit of my invention and the spirit and scope of the appended claims.

I claim:

1. In combination; a vehicle frame including side rails; a cross member secured to and spanning said rails and having integral portions depending therefrom adjacent said rails; brackets secured to the outer sides of said rails opposite the ends of said cross member, each of said brackets having spaced arms depending therefrom, one of which is secured to the respective depending portion; and trunnions secured in said arms.

2. In combination; a vehicle frame including side rails; a cross member secured to and spanning said rails and having integral portions depending therefrom adjacent said rails; brackets secured to the outer sides of said rails opposite the ends of said cross member, each of said brackets having spaced arms depending therefrom, one of which is secured to the respective depending portion; a trunnion secured in each pair of said arms; a bushing on said trunnion between said arms; a bearing sleeve on said bushing; and a member secured to and extending from opposite sides of said sleeve, and having rounded top with grooves therein.

3. In combination; a vehicle frame including side rails of channel form with their channel sides confronting; a cross member of channel form spanning said rails and having closed ends fitted and secured within said rails, and depending portions adjacent its ends projecting beneath said rails; and brackets secured to the outer sides of said rails, respectively, and each having a pair of spaced plates extending below the rail adjacent said depending portion; and means for securing said plates to said depending portion.

4. A cross member comprising; a channelled body adapted to span the side rails of a vehicle frame; walls integral with an spanning the ends of said body and adapted to be secured to the side rails; and channelled extensions formed integral with and projecting substantially at right angles from said body at points adjacent the ends thereof.

5. In combination; a cross member adapted to be secured to the side rails of a vehicle frame so as to span the rails at the inner sides thereof, said cross member having portions extending laterally therefrom so as to depend from said rails; and a pair of brackets each having an upper part adapted to be secured to the respective rail at the outer side thereof, and a lower part depending from said rail and having spaced arms, one of which parallels and is secured to the respective portion of the cross member.

LLOYD D. KAY.